United States Patent Office 3,234,289
Patented Feb. 8, 1966

3,234,289
METHOD OF MAKING A TETRABROMO-
BISPHENOL
Henry E. Hennis, Midland, Mich., assignor to The Dow Chemical Company, Midland, Mich., a corporation of Delaware
No Drawing. Filed May 26, 1961, Ser. No. 112,768
3 Claims. (Cl. 260—619)

The invention pertains to an improved method of making tetrabromobisphenols. The term "bisphenols," as used herein, means the binuclear phenolic compounds among which are 4,4'-dihydroxybenzophenone; 4,4'-methylenediphenol; 4,4'-ethylidenediphenol; 4,4'-isopropylidenediphenol; 4,4'-isobutylidenediphenol; 4,4'-sec.-butylidenediphenol; and 4,4'-dihydroxybiphenyl. Binuclear phenolic compounds useful in the practice of the invention may also be referred to as alkylidenediphenols.

Bisphenols are widely used in the chemical art and especially in admixture with epichlorohydrin under suitable reaction conditions in the manufacture of epoxy resins. Recently it has been discovered that halogenated bisphenols, and most especially tetrabromobisphenols, produce epoxy resins that are resistant to burning. Such properties are often referred to as flame-retardant. When the resin is sufficiently flame-retardant to extinguish itself after having been subjected to ignition heat, it is known as self-extinguishing.

Numerous difficulties have been encountered in the making of tetrabromobisphenols. Merely admixing bromine with a body of a bisphenol has not been satisfactory. Neither the use of selected organic solvents nor the use of water as a reaction medium has resulted in satisfactory yields of sufficiently pure tetrabromobisphenols. A need exists for a more efficient method for making a more satisfactorily pure tetrabromobisphenol.

The invention, as hereinafter described and concisely defined in the appended claims, provides a method which obviates these and related difficulties.

The invention is the method of making a tetrabromobisphenol comprising (1) admixing a premixture of water and a selected alkanol or mixture of such alkanols (as hereinafter defined), in a weight ratio of the alkanol to water of between 1 and 3, with a bisphenol in a weight ratio of the alkanol-water mixture to the bisphenol of between 1.6 and 2.7; (2) adding bromine to the resulting mixture, accompanied by moderate stirring, in a total amount sufficient to provide at least about 4 moles of bromine ($Br_2$) per mole of the bisphenol, at a temperature of between about 15° and about 45° C., over a period of at least about 0.25 hour and preferably over a period of at least about one hour; and (3) post-heating the reaction mixture at between about 55° and about 83° C., and preferably at the boiling point of the alkanol-water mixture for at least about 0.25 hour and preferably for about 0.5 hour, accompanied by moderate stirring. The post-heating or post-reaction period is best carried out under reflux conditions. Tetrabromobisphenol is thereby formed in the reaction mixture which is then cooled and the tetrabromobisphenol recovered, water-washed, and dried.

The alkanols to employ in the practice of the invention are selected from the class consisting of ethanol, isopropanol, n-propanol, and n-butanol or mixtures thereof. Trace amounts of other lower alkanols may be tolerated. Ethanol is the preferred alkanol to employ. The preferred weight ratio of the alkanol to water is between about 1.8 and 2.2. When a higher ratio of alkanol to water is employed, the yield is reduced and when a lower ratio is employed the purity suffers and the product tends to become discolored.

The preferred bisphenol to employ is 4,4'-isopropylidenediphenol, known as bisphenol A. The preferred weight ratio of the alkanol-water mixture to the bisphenol is between about 2 and about 2.5.

The bromine is usually added as a liquid, preferably at between about 22° and 28° C. and preferably for a period of about 1.5 hour. At least the stoichiometric quantity of the bromine to yield the tetrabromobisphenol should be employed. More than the stoichiometric quantity may be employed without harmful effects but offers no benefit and constitutes a waste.

By the term "reflux conditions," which are preferably maintained during the post heating period, are meant conditions whereby the reaction mixture is heated at the boiling point of the liquid portion of the reaction mixture in a vessel provided with a reflux condenser or column which, conventionally, is provided with a small vent at the top. Aside from a very small amount of volatile material which escapes through the vent, the material, subjected to reflux conditions, continues to volatilize, condense, and drain back into the vessel. Sometimes, if desired, the reflux condenser is equipped with a trap of the Dean-Stark type which collects some or a substantial portion, as desired, of the condensate. The reaction vessel employed is provided with stirring, heating and heat-recording means. The reflux temperature varies according to the boiling point of the alkanol-water mixture employed. For example, when the mixture is ethanol and water in a weight ratio of ethanol to water of 2, the reflux temperature is usually about 83° at the start of the post-reaction period and usually drops off to about 75° C. near the end of the period. The vent permits the escape of alkyl bromide which may be formed during the reaction. The preferred length of time for the post-reaction period is usually about 1.5 hours for an ethanol-water mixture.

After cooling the reaction medium containing the reaction product to between about room temperature and about 28° C., or preferably to between about 25° C. and room temperature, the brominated bisphenol produced is collected, usually on a filter, e.g., a sintered glass filter, and washed with water, preferably while applying a vacuum to the filter. Drying of the precipitate thus recovered is usually carried out in an oven, e.g., one at a temperature of between about 40° and about 80° C.

The product formed, when an ethanol-water reaction medium is employed, is substantially water-white and is at least 96 percent, and usually between 98 and 99 percent, pure tetrabromobisphenol. The yield of the tetrabromobisphenol thus made is at least 95 percent and usually between 96 and 97 percent of the amount theoretically possible, based upon the stoichiometric reacting weights of bisphenol and bromine employed.

To be considered "acceptable," as the term is herein used, to attain the objects of the invention, the method employed must provide a yield of tetrabromobisphenol, of at least 88 percent by weight of that theoretical possible, which has a freezing point of not less than 171.5° C. A relatively low A.P.H.A. color value, e.g., not over about 175, is desirable but not essential since some darkening of the product is not detrimental for a number of reasons. It is preferred that conditions of reaction be employed, in the method of the invention to yield at least 93 percent, by weight of tetrabromobisphenol theoretically possible, which has a freezing point of not less than 174.5° C. An A.P.H.A. value not over 150 is desired. The A.P.H.A. method of color determination is defined in Standard Method for the Examination of Water and Sewage, 9th Ed. (1946), published by the American Public Health Association (A.P.H.A.), at pages 14 and 15.

The following examples are illustrative of modes of practicing the invention. It is to be understood that variations from the amounts of reactants and reaction conditions employed in the examples may be made, in accordance with the practice of the invention, as hereinbefore described, without being outside of the purview of the invention.

*Example 1*

Into a 2-liter resin pot, equipped with a motor-driven stirrer, a reflux condenser in connection with a Dean-Stark trap, and a dropping funnel, were placed 508 grams of about 95 percent ethanol (balance water), 203 grams of water, and 344 grams (1.5 moles) of bisphenol A. A substantially homogeneous solution was obtained within a few minutes. Thereafter the resin pot was immersed in an ice pail and 968 grams (6.5 moles) of bromine were added slowly to the solution over a period of 1.5 hours, accompanied by stirring. A reaction temperature of between 24° and 26° C. was maintained during the addition of bromine. Some solids began to separate and settle after about 10 percent of the bromine had been added and continued to form and settle throughout the reaction period. The reaction mixture was then heated to the reflux temperature which was 83° C., accompanied by stirring, and held at the reflux temperature for an additional period of 0.5 hour. Ethyl bromide, which had formed during the reaction, was permitted to escape during this post-heating period. A very small portion of the solvent also usually escapes during the post-heating, refluxing period. During the refluxing period, the temperature of the pot slowly decreased to about 75° C. Following the post-heating period, the reaction mixture was cooled to 25° C. and the solids produced by the reaction collected on a sintered glass filter, washed with water to remove ethanol and some by-product HBr, and thereafter dried in an oven maintained at 60° C. The product thus obtained was analyzed and found to be 4,4'-isopropylidenebis (2,6-dibromophenol). It had a freezing point of 175.0° C. The color was ascertained, according to the A.P.H.A. method, on a solution consisting of 10 grams of the product dissolved in 50 grams of methanol, and found to be 132. The total yield was 788 grams which was 96.0 percent of that theoretically possible. A freezing point of 175° C. shows a purity of 97.5 percent independently ascertained by infrared spectroscopy.

*Examples 2–5*

Additional examples were run wherein 711 grams of total solvent (consisting of 1.5 parts by weight of ethanol to 1 of water) were admixed with 344 grams (1.51 moles) of bisphenol A, and 968 grams (6.05 moles) of bromine added thereto over a period of 1.5 hours at 25° C. followed by a post reaction period of 0.5 hour, at between 75 and 83° C., in accordance with the procedure set out in greater detail in Example 1 above. This post reaction temperature was somewhat below the reflex temperature of the higher alcohol-water mixtures. Table I, below, contains a summary of conditions and properties of the product made.

TABLE I

| Example Number | Solvent Mixture [1] | | Yield [2] | Color [3] APHA | Freezing Point in ° C. | Remarks |
| --- | --- | --- | --- | --- | --- | --- |
| | Ingredients | Weight Ratio | | | | |
| 2 | n-Butyl alcohol and water | 2.12:1.00 | 88.5 | 80 | 178.5 | Purity and color excellent, but yield low. |
| 3 | Isopropyl alcohol and water | 2.12:1.00 | 91.0 | 130 | 171.5 | Purity, color and yield fair. |
| 4 | n-Propyl alcohol and water | 2.12:1.00 | 93.7 | 90 | 175.5 | Acceptable, but product hard to wash. |
| 5 | Ethanol and water | 2.12:1.00 | 96.0 | 132 | 175.0 | Yield especially high. |

[1] These runs utilized 711 g. of solvent, 344 g. (1.51 moles) of bisphenol A, and 968 g. (6.05 moles) of bromine. Bromination was conducted at 25° C. for a reaction time of 1.5 hours. The post reaction temperature was at 75°–83° C. for a period of 0.5 hours.
[2] Percent by weight of theoretical based on bisphenol present.
[3] APHA color was determined on a solution of 10 g. of tetrabromobisphenol A dissolved in 50 ml. of methanol.

Reference to Table I shows that the ethanol-water mixture resulted in the highest yield of product.

For purposes of comparison, additional runs were then made following the recommended procedure of the invention except employing mixture of water with other organic materials, instead of the alkanols above named, in a weight ratio of water to the organic materials of 2.12. The organic materials employed were secondary butyl alcohol, tertiary butyl alcohol, ethylene glycol, acetic acid, carbon tetrachloride, chloroform, methylene-chloride, perchlorethylene, benzene, and Skelly solvent, the latter having a distillation range between 60 and 100° C.

None of the mixtures so made was satisfactory as a reaction medium in the practice of the invention. In the case of methanol-water solvent system, the freezing point was 167 which showed that the product was insufficiently pure to be acceptable. In the case of water intermixed with one of tertiary butyl alcohol, the ethylene glycol, or the acetic acid, the bisphenol was either too insoluble therein or the reaction mixture became too thick or gummy to be operable. In the case of all others set out above, the reaction was too slow to be useful.

*Examples 6–10*

Additional examples were run to show the effects of varying the ratio of ethanol to water in an ethanol-water mixture. The other reaction conditions and amounts of reactants were maintained substantially the same as in Example 1 above. The pertinent conditions and properties of the product are shown in Table II below.

TABLE II

| Example Number | Ethanol to water weight ratio [1] | Yield [2] | Color APHA [3] | Freezing Point in ° C. | Remarks |
| --- | --- | --- | --- | --- | --- |
| 6 | [4] | 76.0 | 55 | 179 | Not acceptable; yield too low. |
| 7 | 3.00 | 93.0 | 105 | 175.5 | Acceptable; but yield low. |
| 8 | 2.12 | 96.0 | 132 | 175.0 | Acceptable; very good yield and purity. |
| 9 | 1.00 | 95.5 | 170 | 172.0 | Acceptable; shows some falling off in yield, color and purity. |
| 10 | 0.33 | (could not be evaluated) | | | Not acceptable; reaction mixture too viscous to stir. |

[1] Each run utilized 711 g. of solvent, 344 g. (1.51 moles) of bisphenol A and 968 g. (6.05 moles) of bromine. Bromination was conducted at 25° C. over a period of 1.5 hours. The post reaction conditions were at a temperature of 75°–83° C. and for a period of 30 minute.
[2] Percent by weight of theoretical yield based on bisphenol present.
[3] APHA color was determined on a solution prepared by dissolving 10 g. of the tetrabromobisphenol A dissolved in 50 ml. of methanol.
[4] 100% Ethanol, no water.

Reference to Table II shows that 100 percent ethanol results in a yield which is too low to be acceptable. Reference to the table also shows on the other hand that a ratio by weight of ethanol to water of 0.33 resulted in a reaction mixture that could not be used. Examples 6 and 10, therefore, are not illustrative of the practice of the invention. Reference to the table also shows that an ethanol to water ratio of 3 is satisfactory but is definitely less desirable than a ratio of about 2. It also shows that an ethanol/water ratio of 1 is acceptable but that the purity of the product is impaired.

varying the amount of bromine to the bisphenol present. In these examples 483 grams of ethanol were admixed with 238 grams of water and 344 grams (1.51 moles) of bisphenol A. The bromine in the amount shown in Table IV below was added thereto. Reaction conditions were the same as those employed in the previous examples, e.g., the reaction was carried out at 25° C. for 1.5 hours and the post reaction under reflux conditions at a temperature between 75° C. to 83° C. Yield, color and the freezing point of the brominated bisphenol thus made are also set out in Table IV.

TABLE IV

| Example Number | Bromine in Grams [1] | Ratio of Br$_2$ Used to Theoretical Br$_2$ Required | Yield [2] | Color APHA | Freezing Point in ° C. | Remarks |
| --- | --- | --- | --- | --- | --- | --- |
| 16 | 871 | 0.900 | 88.2 | 90 | 167 | Not acceptable. |
| 17 | 968 | 1.00 | 96.0 | 132 | 175 | Acceptable; good yield and purity. |
| 18 | 1,065 | 1.10 | 96.5 | 138 | 175 | Acceptable; good yield and purity. |

[1] Each run utilized 483 g. of ethanol, 228 g. of water, and 344 g. (1.51 moles) of bisphenol A. Bromination was conducted at 25° C. for a 1.5 hour reaction time. The post reaction temperature was 75°–83° C. and for a period of 30 minutes.
[2] Percent by weight of theoretical yield based on bisphenol present.
[3] APHA color was determined with a solution of 10 g. of tetrabromobisphenol A dissolved in 50 ml. of methanol.

*Examples 11–15*

Additional examples were run to show the effect of varying the ratio of alkanol-water solvent to bisphenol A in accordance with the practice of the invention. The reaction conditions and quantities employed were otherwise substantially the same as those employed in the previous examples. The more important conditions and properties of the product are shown in Table III, below.

Table IV shows that both the yield and purity suffer appreciably when an insufficient amount of bromine is employed to react fully with the bisphenol present. It also shows that, although some increased yield was found when more then the stoichiometric quantity of bromine was provided, such increase would appear to be uneconomical when the bromine to the bisphenol was increased appreciably above the stoichiometric amount required.

TABLE III

| Example Number | Weight in Grams of Ethanol/Water (weight ratio 2.12) [1] | Ratio of Ethanol/Water to Bisphenol A by Weight in Grams | Yield [2] | Color APHA [3] | Freezing Point in ° C. | Remarks |
| --- | --- | --- | --- | --- | --- | --- |
| 11 | 533 | 1.55 | 96.4 | 230 | 174 | Acceptable; purity less desired and color poor. |
| 12 | 639 | 1.85 | 96.2 | 136 | 174.5 | Acceptable. |
| 13 | 711 | 2.07 | 96.0 | 132 | 175 | Do. |
| 14 | 782 | 2.27 | 96.0 | 103 | 175 | Do. |
| 15 | 889 | 2.59 | 94.9 | 80 | 175 | Acceptable, but yield shows decline. |

[1] Each run utilized 344 g. (1.51 moles) of epoxy resin grade bisphenol A and 968 g. (6.05 moles) of bromine. Bromination was conducted at 25° C. and 1.5 hours reaction time. The post reaction was carried out at a temperature of 75°–83° C. and a period of 30 minutes.
[2] Percent by weight of theoretical yield based on bisphenol present.
[3] APHA color was determined on a solution prepared by dissolving 10 g. of tetrabromobisphenol in 50 ml. of methanol.

By reference to Table III it can be seen that the color suffers when the ratio of total reaction medium to the bisphenol is low. On the other hand it can be seen that when the ratio of reaction medium to the bisphenol is considerably high, the percentage yield shows a decrease. The purity of the product, as evidenced by the freezing point, and the high percentage of yield of each of the examples in Table III shows the effectiveness of the method of the invention.

*Examples 16–18*

Additional examples were run to show the effect of

*Examples 19–22*

Examples were also conducted in accordance with the invention to show the effect of variations in the bromination reaction temperature. The same solvent system, the same quantity of bisphenol A, and the same reaction conditions were employed as in Examples 11–15. The temperature and salient properties of the product made are set out in Table V below.

TABLE V

| Example Number | Reaction Temp. in ° C.[1] | Yield [2] | Color APHA [3] | Freezing Point in ° C. | Remarks |
| --- | --- | --- | --- | --- | --- |
| 19 | 15 | 95.0 | 150 | 174.5 | Acceptable, but rate of reaction slow. |
| 20 | 25 | 96.0 | 132 | 175 | Acceptable. |
| 21 | 35 | 95.0 | 160 | 174.5 | Do. |
| 22 | 45 | 93.3 | 185 | 171.5 | Acceptable, but color, yield and purity show declines. |

[1] Each run utilized 483 g. of ethanol, 228 g. of water, 344 g. (1.51 moles) of epoxy resin grade bisphenol A, and 968 g. of bromine. Bromination time was 1.5 hours and the post reaction temperature was 75°–83° C. for 30 minutes.
[2] Percent by weight of theoretical, based on bisphenol employed.
[3] APHA color was determined with a solution of 10 g. of tetrabromobisphenol A dissolved in 50 ml. of methanol.

Examination of Table V shows that when the bromination reaction is carried out at the lower temperature, i.e., substantially below 25° C. the reaction rate is slow. On the other hand, when the temperature employed is appreciably above 25° C., the color of the product, the percentage yield and purity suffer. A temperature of about 25° C. was shown to result in the best percentage yield as well as in a clearer color and purer product.

*Examples 23–25*

Further examples of the invention were run to show the effect of variations in the length of the reaction period. The same amounts of ethanol, water, bisphenol A, and bromine and the same reaction temperature and post reaction conditions were employed as in Examples 12–16, above. The reaction time during which the bromine was admixed with the bisphenol, however, was varied in successive examples from 10 minutes to 720 minutes. The effects on the product made are set out in Table VI, below.

TABLE VI

| Example Number | Reaction time in min.[1] | Yield [2] | Color APHA [3] | Freezing Point in ° C. | Remarks |
|---|---|---|---|---|---|
| 23 | 10 (ca. 0.17 hours). | 95.7 | 190 | 174.5 | Acceptable but color higher than desired. |
| 24 | 90 (1.5 hours). | 96.0 | 132 | 175 | Shows improved yield, purity and color over #23. |
| 25 | 720 (6 hours). | 95.5 | 135 | 175.5 | Acceptable but shows slight decrease in yield and color from #24. |

[1] Each run utilized 483 g. of ethanol, 228 g. of water, 344 g. (1.51 moles) of epoxy resin grade bisphenol A, and 968 g. of bromine. Bromination time was 1.5 hours and temperature was 25° C. Post reaction temperature was 75°–83° C.
[2] Percent by weight of theoretical based on bisphenol present.
[3] APHA color was determined with a solution of 10 g. of tetrabromobisphenol A dissolved in 50 ml. of methanol.

Examination of the results obtained when employing the reaction periods set out in Table VI, shows that, although the purity of the product was satisfactory in each example, the percentage yield as well as the color and to some extent the purity were impaired when the reaction period was only 10 minutes. It can be deduced from the borderline results obtained in Example 23 in contrast to the excellent results obtained in Examples 24 and 25, that a period of time below 10 minutes would not be recommended in view of the enhanced results obtained by a somewhat extended time. On the other hand there appears to be no purpose in prolonging the reaction period beyond about 1.5 hours since the purity of the product, color, and percentage yield were all as good or better at 1.5 hours than those obtained by the protracted heating period.

*Examples 26–31*

A series of examples was run to show the effect of variations in the post reaction temperature. Whereas all the post reaction periods in the examples above consisted of heating at between 75° and 83° C. for 0.5 hour, in the instant examples, heating was carried out for 0.5 hour at temperatures some of which were considerably below that temperature. The length of the heating period and the salient properties of the product made are set out in Table VII, below Examination of Examples 26 and 27 of Table VII shows that the purity of the product is definitely unacceptable at the lower temperatures there employed. Examination of Example 28 shows that a post-heating temperature of at least 58° C. results in an acceptable yield and purity of product. By interpolation of the results obtained at 25°, 35°, and 58°, a minimum temperature of about 55° C. should produce acceptable results. Examination of Example 29 shows that an increase of a few degrees above the lower acceptable temperature resulted in a better quality product and improved yield. Examples 30 and 31 clearly show that both the percent yield and purity of product are improved when the post-heating is carried out at least at 70° C. and preferably at 83° C. (boiling point of ethanol-water mixture). The boiling temperature of the alkanol-water mixture is usually employed in a vessel equipped with a reflux condenser because such an arrangement is substantially self-regulatory, the reaction medium is largely returned to the reaction vessel, and such by-products as HBr and alkyl bromides, having a lower boiling temperature than the alkanol-water azeotrope, are largely removed.

The advantages of the practice of the invention are clearly apparent. By employing an alkanol from among those hereinabove named and a proper proportion of water as the reaction medium and reacting the acceptable proportions of bromine and bisphenol therein, followed by a post reaction refluxing treatment, there results better yields, a purer product, and a more economical and efficient method for the production of tetrabrominated bisphenol than heretofore known.

Having described my invention what is claimed and desired to be protected by Letters Patent is:

1. The method of making a tetrabromobisphenol comprising: admixing a premixture of water and an alkanol selected from the class consisting of ethanol, isopropanol, n-propanol, and n-butanol and mixtures thereof, in a weight ratio of the alkanol to water of between about 1.8 and about 2.2 with an alkylidenediphenol in a weight ratio of the water-alkanol mixture to the alkylidenediphenol of between about 2 and 2.5; adding bromine to the resulting admixture, accompanied by moderate stirring, in a total amount sufficient to provide a ratio of about 4 moles of bromine per mole of the alkylidenediphenol at a temperature of between about 22° and 28° C. over a period of at least about 1 hour; post-heating the reaction mixture in a vessel equipped with a reflux condenser at a

TABLE VII

| Example Number | Post Reaction Temp. in ° C. | Yield [2] | Color APHA [3] | Freezing Point in ° C. | Remarks |
|---|---|---|---|---|---|
| 26 | 25 | 94.6 | 155 | 164 | Not acceptable; purity too low. |
| 27 | 35 | 94.8 | 142 | 167 | Not satisfactory, purity too low. |
| 28 | 58 | 94.2 | 64 | 172 | Acceptable. |
| 29 | 60 | 94.8 | 95 | 173.5 | Do. |
| 30 | 70 | 95.2 | 95 | 175 | Do. |
| 31 | 83 | 96.0 | 132 | 175 | Do. |

[1] Each run utilized 483 g. of ethanol, 228 g. of water, 344 g. (1.51 moles) of bisphenol A, and 968 g. of bromine. Bromination time was 1.5 hour and reaction temperature was 25° C. Post reaction time was 90 minutes.
[2] Percent by weight of theoretical, based on bisphenol present.
[3] APHA color was determined on a solution of 10 g. of tetrabromobisphenol A dissolved in 50 ml. of methanol.

temperature not below the boiling point of the liquid portion of the reaction mixture under reflux conditions for at least 0.5 hour to produce the tetrabromobisphenol of high purity in good yield; and recovering, water-washing, and drying the tetrabromobisphenol so made.

2. The method according to claim 1 wherein the alkylidenediphenol is 4,4-isopropylidenediphenol and the alkanol is ethanol.

3. The method according to claim 1 wherein the reaction temperature during the addition of bromine is between 24° and 26° C. and the period of said addition is at least about 1.5 hours.

References Cited by the Examiner

UNITED STATES PATENTS 3,029,291  4/1962  Dietzler _____ 260—619

LEON ZITVER, *Primary Examiner.*

CHARLES B. PARKER, *Examiner.*